3,096,179
TWO-PACKAGE ANGEL FOOD CAKE MIX

Thomas P. Finucane, Hartsdale, N.Y., William A. Mitchell, Lincoln Park, N.J., and Leonard Z. Raymond, White Plains, N.Y., assignors to General Foods Corporation, White Plains, N.Y., a corporation of Delaware
No Drawing. Filed Apr. 17, 1962, Ser. No. 188,278
12 Claims. (Cl. 99—94)

This invention relates to improved mixes of the foam-batter or non-shortening type for use in preparing angel food cakes, and the like, wherein egg white is employed as a whipping agent to develop a foamy batter. More particularly, the invention is concerned with dry mixes for use in quickly and easily preparing foam-batter type cakes of increased height and good quality. This application is a continuation-in-part of abandoned U.S. Serial No. 430,980, filed May 19, 1954; U.S. Serial No. 794,246, filed February 19, 1959, now U.S. Patent No. 2,916,380; and abandoned U.S. Serial No. 875,757, filed December 7, 1959.

Cake mixes of the foam-batter type presently on the market usually comprise two packages, one of which contains dried egg white, sugar, and if desired, additives such as cream of tartar and sodium hexametaphosphate. The second package contains flour, additional sugar and, if desired, other additives such as cream of tartar, starch and flavor. To prepare a cake from such a mix, water is added to the ingredients of the first package to reconstitute the egg white which is then whipped into a foam into which the ingredients of the second package are folded. The resulting batter is then baked to provide the finished cake.

Such foam-batter cakes whether they be of the angel food, sponge or chiffon variety are generally considered difficult to prepare by reason of the care which must be exercised in developing the foam and maintaining the same while incorporating the other cake ingredients. Numerous cake improvers have been employed in the past with a view to increasing the ability of egg white to develop good foam volume and stability when folding farinaceous ingredients into the foam.

However, despite the advances made in cake making techniques and the considerable commercial success experienced by using such cake improvers, there are a number of disadvantages which still characterize foam-batter cake preparation. The cake mix recipe must be followed precisely. The period of time during which the egg white is whipped is critical as is the manner in which whipping is performed, viz., so-called hand and mechanical whips still produce different degrees of foam development. Then too, insufficient whipping by hand or mechanical means may not result in a sufficiently aerated foam, while excess whipping can result in a certain degree of foam destruction.

Difficulties stem from non-uniformity of raw materials from which the mixes are manufactured, and from uncleanliness of mixing utensils. It has been found that the whipping characteristics of dried egg white vary and that trace quantities of fat either in the mixing bowl or on the whipping apparatus can substantially impair foam development. Accompanying such impediments to batter preparation is a consequent reduction in foam height or volume. Also, when egg white (egg albumen) is used as the sole whipping agent, particularly when used at low levels in the interest of increased economy, its film forming property is such that an overexpansion of the air cells occurs upon baking with a resulting collapse of the cake upon cooling. Yet another problem in the production of cake mixes which will produce constantly successful cakes of the same quality is the variation in the farinaceous ingredient. This component of the mix contains a fatty anti-foaming agent in varying amounts, and as a result the quality of the cakes produced will vary with the level of anti-foaming agent present. Yet another problem is the great variation in the milling of flour which causes significant differences in different lots of flour.

Even after development of the desired foam volume, the foam developed may not have the desired stability with the result that there may be a substantial reduction in foam height due to folding in of the ingredients of the second package. The folding in of ingredients frequently presents problems to the housewife since she will generally use the same folding technique each time she prepares an angel food cake. However, she is totally unaware of the possible variation in ingredients and in particular, of the amount of anti-foaming agent present in the mix she is using. Therefore, she is unable to compensate for such variations and will not produce consistently good cakes. In many instances, although the desired foam height may be accomplished, final cake volume or height after baking as well as the degree of quality for the cake may be inadequate.

A desirable feature for foam-batter type cake preparations is the provision of a dry mix which when made into a foam batter type cake, will contain insufficient anti-foaming agent to collapse the foam batter when the anti-foaming agent is added thereto, but sufficient anti-foaming agent to prevent excessive swelling of the foam batter on baking with consequent collapse of the cake on subsequent cooling. Heretofore, it has been impossible to prepare successful angel food cakes from mixes employing starch as the sole farinaceous ingredient. By adding a fatty anti-foaming agent to the starch it is possible to very carefully control the level of anti-foaming agent present and thereby permit the housewife to consistently obtain excellent cakes. The use of a starch as the sole farinaceous ingredient would be highly desirable since problems arising from variations in wheat flour and in the milling of such flour would be eliminated.

Objects of the present invention include the provision of increased foam height and foam stability, increased tolerance to the duration and character of whipping, decreased sensitivity to varying quality of cake ingredients and conditions of making cake volume or height and quality after baking, and particularly when employing, in the interest of enonomy, low levels of egg white (albumen) as the principal whipping agent. Yet another object of the present invention is the ability to prepare the desirable cakes produced by the present invention using a starch as the sole farinaceous ingredient. Other objects will be apparent from the discussion that follows.

In has been discovered that the objects of the present invention can be obtained in two-package foam batter type cake mixes containing egg white as the principal whipping agent and sugar in one package and farinaceous ingredient in the other package by adjusting the aggregate level of fatty egg white anti-foaming agent in the package containing the farinaceous ingredient to an amount insufficient to cause collapse of the foam batter and prevent sufficient expansion of the cells of the egg white foam batter on baking but sufficient to prevent excessive swelling of the foam batter on baking and subsequent collapse of the cake on cooling. Levels of fatty anti-foaming agent of 0.04% to 9.0% by weight of the egg white in the mix and present in the package containing the farinaceous ingredient have been found to produce very desirable cakes.

As used in the present invention, the term "farinaceous ingredient" refers to all of the various starches, flours and mixtures of the same obtained from cereals, tubers, roots and the like. When flour is the farinaceous ingredient employed, its fat content must be reduced although not completely eliminated if the benefits of the present invention are to be realized and this reduction can be effected by solvent extraction. When starch is the sole farinaceous ingredient employed, it is possible to obtain a wide variation in texture depending on the preference of the consumer market merely by varying the level of fatty anti-foaming agent added. Thus, it is possible to use the same starch to obtain cakes which can vary from fine textured cakes to coarse textured, open grain cakes.

In addition to the wheat flour and starch normally employed in angel food cake mixes, flours and starches derived from other materials such as corn, rice, arrowroot, potato, tapioca, sago, sorghum, soy, and the like, may also be employed. Such materials will seldom be used by themselves but more often in combination with each other and most likely in combination with wheat starch or wheat flour. Their use presents slightly different problems in connection with controlling the fat content of the mix. For example, potato starch is practically devoid of fat whereas soy flour is relatively high in fat content as are the other grades of wheat flour that are not ordinarily employed as cake flour.

Cake flour, a fraction of wheat flour, generally contains about 1.3% fat as determined by the acid hydrolysis method, about 0.8% as determined by extraction with hexane and about 1.1% as determined by extraction with ethanol (95%). The hexane-extractable fat in starch is about 0.2% and that in the extracted flour discussed hereinafter is about 0.3%. The fat is only partially extracted from the flour using ethanol (95%) because exhaustive extraction is impractical. Flour extracted by other solvents and to different degrees may also be employed, of course.

While the fat content of flour has, for all practical purposes, been found the element to be controlled in order to provide such an improved cake mix, various other related materials, such as fatty acids, soaps, fatty acid amides, lipides, lipo-proteins, mineral oils, fatty alcohols, fatty esters, waxes, phospho-lipides, and the like, will conceivably function in an equivalent manner. Such materials would be additives to the farinaceous material and do not occur in ordinary foam-batter cake ingredients.

There are several different ways in which the flour fat content of the foam-batter cake mix may be controlled. These include:

(1) The use of partially extracted flour having the desired fat content.

(2) A more completely extracted flour or a starch to which fatty anti-foaming agent has been added either to all of the flour or starch or to a portion thereof.

(3) Combinations of extracted flour with regular, untreated flour.

(4) Starch to which fatty anti-foaming agent has been added.

It is somewhat difficult to control the fat content in the case of the first embodiment mentioned above and greater ease of control is encountered with the second embodiment. Here, however, care should be taken to secure the uniform distribution of the flour fat added back to the extracted flour. This can be accomplished by adding the dissolved fat to the flour or starch uniformly, removing the solvent by evaporation and further insuring uniform distribution by tumbling the flour or starch or otherwise mixing it. Likewise, good mixing, as by tumbling, should be employed in the third embodiment above in order to secure uniform distribution of the regular, untreated flour throughout the starch or extracted flour. The fourth embodiment is the easiest to control and for reasons set forth heretofore is the most desirable embodiment.

Experience with the various formulations capable of providing the cake mixes of the present invention indicates that the flour fat as determined by hexane extraction that may be contained in the second package of the mix and provide the advantages of the present invention is of the order of 0.04–1.5% by weight of the dried egg white in the mix. Cakes prepared from mixes containing the lower levels of fat are more susceptible to implosion and cakes prepared from mixes containing the very high levels of fat are fine textured and low in volume. This experience also indicates that when a fatty acid such as stearic acid is employed as the fatty anti-foaming agent in a cake mix containing starch as the sole farinaceous ingredient, then the stearic acid may be employed at a level of 0.9–9.0% by weight of the dried egg white in the mix and preferably at a level of 4.0–5.0% by weight of the dried egg white in the mix. Cakes prepared from mixes containing the lower levels of fat are more susceptible to implosion and cakes prepared from mixes containing the very high levels of fat are fine textured and low in volume. Cakes prepared from mixes containing the preferred level of stearic acid have the best volumes and textures. Furthermore, it is possible to employ either stearic acid by itself or a combination of stearic acid and other fatty acids or fats to obtain the desired results. While other anti-foaming agents such as those mentioned specifically above should be employed in somewhat different amounts, said amounts will be of the same order of magnitude and can be readily determined by baking cakes from a series of mixes containing progressively increasing amounts of such other anti-foaming agents.

Even with a particular anti-foaming agent such as the hexane extractable flour fat or a fatty acid to which the present invention is particularly directed, the optimum levels to be employed depend upon other factors such as the distribution of the anti-foaming agent, whether it is contained on the surface of the flour or other carrier or is held within the flour granule, the ratio of farinaceous ingredient to egg white and other factors. For example, the optimum amount of fat is lowered when a higher ratio of flour or other farinaceous ingredient to egg white is employed.

The results provided by the present invention may be obtained either by employing a fatty anti-foaming agent which is effective when the second package is folded into the first package, such agents being those which are liquid or semi-liquid at the temperatures employed, or on the other hand, the results may be obtained by employing an agent such as stearic acid which is solid when the second package is being folded into the first but which becomes liquid upon baking. Similar results may be obtained by coating or encapsulating the fat content of the mix with a water-soluble material such as gelatin, pectin, and the like which is relatively slow to dissolve at room temperatures so that the fat does not come into play until after folding has been completed.

When a fatty acid is employed in combination with starch or flour its effect may be controlled by dry blending it with the farinaceous ingredient or by coating it on the farinaceous ingredient. When stearic acid is the fatty acid employed, it is preferred to dry blend it in a finely powdered form with the farinaceous ingredient.

The flour fat or lipide and stearic acid requirements for a two-package angel food cake mix were determined by employing a basic formulation consisting of starch, sugar, egg white, and cream of tartar, with the fatty anti-foaming agent being the variable in the basic formulation. A standard procedure for incorporating the fatty material on the starch was established which gave a good dispersion of the fatty material over the starch surface. It should be noted here, however, that the anti-forming agent level determined is restricted to the conditions used to apply the fat to the starch surface. The critical level will change with the method of coating the formulation and the presence of foam weakening agents such as hydrolyzed proteinaceous extracts like hydrolyzed soy protein. When all of these variables are taken into consideration, an optimum film strength necessary in the egg white foam will be determined. The film strength is optimum when the effect of the anti-foaming agent is such that the condition of the protein cells will be sufficiently strong to resist collapse when the farinaceous ingredient is folded in and sufficiently weak or thin so as to insure against over-expansion while assuring adequate expansion of the batter upon baking.

It was found under the condition employed that where a hydrolyzed soy protein was present in addition to the flour lipide, improved results occurred. The presence of the hydrolyzed soy protein makes the system initially more sensitive to the destructive effect of the lipide, by altering the type of film formed by the egg white. It also favors the formation of a foam system characterized by its greater stability and elasticity. Thus, the foam system has larger air cells in the batter stage and on baking the protein is coagulated and has sufficient stability to maintain itself in baking and cooling. The end result is a cake with larger air cells having thin cell walls.

Where stearic acid (U.S.P.) was the fatty anti-foaming agent employed, levels of 0.9–9.0% by weight of the egg white in the mix may be employed. While it has been found particularly effective in the case of flour lipide to spray or coat the anti-fomaing agent onto the farinaceous ingredient, in the case of stearic acid it has been found most desirable to dry blend finely powdered stearic acid with the farinaceous ingredient.

The anti-foaming agent present in the mix influences both the stability and the nature of this protein film. In the absence of sufficient anti-foaming agent, on baking a cell system is developed which is weak and unstable. This "weak" cell system will then either collapse while still in the oven or on cooling. In the first case, the collapse is due to the rupture of the cells by expanding gas; in the second instance, the cells cannot maintain themselves against the shrinkage associated with cooling.

When flour lipide is present at the optimum level, batter volume and final cake volume are controlled by foam destruction which is selective in nature. The selective process apparently breaks or "pops" those air cells which are enveloped by a "weak" protein film. The resulting batter foam system then has sufficient stability to maintain itself in the baking and cooling process and a good cake results.

A typical two-package dry cake mix for use in preparing angel food cake in accordance with the present invention is as follows.

*Example 1*

Package 1:                                       G.
  Degraded soy protein_____    .3
  Dried egg white_____  39.1
  Coating sugar (sucrose)_____  79.1
  Sodium hexametaphosphate_____   1.5
Package 2:
  Coating sugar (sucrose)_____ 248.1
  Wheat starch (containing 0.2% hexane extractable fat)_____ 110.0
  Cream of tartar_____    2.46
  Sodium chloride_____    1.34
  Flour fat, sufficient to provide aggregate level of 1.0% fat by weight of the egg white.

To prepare a foam batter the ingredients of package 1 are placed in a large bowl with about 1⅓ cups of water at room temperature. The ingredients are stirred until dissolved in the water and are then beaten with a sturdy egg beater, flat wire whip or at the highest speed in an electric mixer such as a No. 10 model Sunbeam Mixmaster at a speed setting of 10 until very stiff peaks form. This usually takes between 2–3 minutes, a shorter whip being required at relatively high levels of degraded soy protein, to wit, 0.5% of the ingredients in package 1. Whipping for periods in excess of 3 minutes is usually unnecessary because of the ability to quickly develop foam. The foam developed remains substantially stable during folding in of the ingredients of the second package. About ¼ of the ingredients of this second package may be sifted into the egg white foam which is folded over to thoroughly distribute the farinaceous ingredients therein. Then, in a plurality of separate additions, the remaining contents of the second package are similarly folded in to provide the desired foam batter. Flavoring may be added, such as ½ teaspoon of vanilla or ¼ teaspoon of almond or both.

The foam batter is then poured into an ungreased 10" tube pan or a 13 x 9 x 2 in. pan and is cut gently therethrough to remove any large air bubbles. The batter is then baked for about 30 minutes in a moderate oven (375° F.). The cake is done when the top springs back after lightly pressing with the finger. The cake is then cooled by turning the pan upside down at once and letting it stand until cool (1–2 hours).

With regard to the sugar in such dry mixes, it is well known that incorporation of sucrose in egg white material-ly aids in its being whipped and, moreover, provides a whip of superior texture and quality; the level of coating sugar employed in package 2 of the two-package mix will, however, have an upper limit above which a certain degree of impairment of foam development is experienced. Increased levels of partially degraded soy protein and alkali metal hexametaphosphate function to increase the amount of sugar which may be used in the first package of the two-package mix allowing the amount of sugar in the second package to be substantially reduced so that there is less material to be folded into the foam. With partially degraded soy protein and alkali metal hexametaphosphate present, the amount of sucrose that may be employed in the first package is somewhere between 1 and 2 times the weight of the dried egg white, the preferred amount being in the order of 1½ times the dried egg white.

The resulting cake was a fine textured cake having a height of about 120 mm.

While the present invention has been described with particular reference to a specific example, it is not to be limited thereby, but reference is to be had to the appended claims for a definition of its scope.

What is claimed is:

1. A two-package angel food cake mix comprising egg white and sugar in one package and farinaceous ingredient in the other package, a fatty anti-foaming agent being present in the package containing the farinaceous ingredient at a level of 0.04–9.0% by weight of the egg white in the mix, wherein the aggregate level of a fatty anti-foaming agent present in the mix is present in an amount insufficient to cause collapse of the foam batter and prevent sufficient expansion of the cells of the egg white foam batter upon baking but sufficient to prevent excessive swelling of the foam batter on baking and subsequent collapse of the cake on cooling.

2. A two-package angel food cake mix comprising egg white and sugar in one package and farinaceous ingredient in the other package, adding a fatty anti-foaming agent to the package containing the farinaceous ingredient at a level of 0.04–9.0% by weight of the egg white in the mix, wherein the aggregate level of a fatty anti-foaming agent present in the mix is present in an amount insufficient to cause collapse of the foam batter and prevent sufficient expansion of the cells of the egg white foam batter upon baking but sufficient to prevent excessive swelling of the foam batter on baking and subsequent collapse of the cake on cooling.

3. A two-package angel food cake mix containing egg white and sugar in one package and farinaceous ingredient in the other package, stearic acid powder being present in the package containing the farinaceous ingredient at a level of 0.9–9.0% by weight of the dried egg white in the mix, wherein the agregate level of fatty anti-foaming agent present in the mix is present in an amount insufficient to cause collapse of the foam batter and prevent sufficient expansion of the cells of the egg white foam batter upon baking but sufficient to prevent excessive swelling of the foam batter on baking and subsequent collapse of the cake on cooling.

4. A two-package angel food cake mix containing egg white and sugar in one package and farinaceous ingredient in the other package, stearic acid powder being present in the package containing the farinaceous ingredient at a level of 4.0–5.0% by weight of the dried egg white in the mix, wherein the aggregate level of fatty anti-foaming agent present in the mix is present in an amount insufficient to cause collapse of the foam batter and prevent sufficient expansion of the cells of the egg white foam batter upon baking but sufficient to prevent excessive swelling of the foam batter on baking and subsequent collapse of the cake on cooling.

5. A two-package angel food cake mix according to claim 4 wherein the farinaceous ingredient is comprised of wheat starch.

6. A two-package angel food cake mix comprising egg white and sugar in one package and farinaceous ingredient in the other package, adding a hexane-extractable fat to the package containing the farinaceous ingredient at a level of about 0.04–1.5% by weight of the dried egg white in the mix, wherein the aggregate level of said fat present in the mix is present in an amount insufficient to cause collapse of the foam batter and prevent sufficient expansion of the cells of the egg white foam batter upon baking but sufficient to prevent excessive swelling of the foam batter on baking and subsequent collapse of the cake on cooling.

7. A two-package angel food cake mix according to claim 6 wherein the farinaceous ingredient is comprised of wheat starch.

8. A two-package angel food cake mix comprising egg white and sugar in one package and farinaceous ingredient in the other package, said farinaceous ingredient being comprised of solvent extracted wheat flour having a hexane-extractable fat at a level of 0.04–1.5% by weight of the dried egg white in the mix, wherein the aggregate level of said fat present in the mix is present in an amount insufficient to cause collapse of the foam batter and prevent sufficient expansion of the cells of the egg white foam batter upon baking but sufficient to prevent excessive swelling of the foam batter on baking and subsequent collapse of the cake on cooling.

9. A two-package angel food cake mix comprising egg white and sugar in one package and farinaceous ingredient in the other package, said farinaceous ingredient being comprised of wheat flour and solvent extracted wheat flour having a hexane-extractable fat at a level of 0.04–1.5% by weight of the dried egg white in the mix, wherein the aggregate level of said fat present in the mix is present in an amount insufficient to cause collapse of the foam batter and prevent sufficient expansion of the cells of the egg white foam batter upon baking but sufficient to prevent excessive swelling of the foam batter on baking and subsequent collapse of the cake on cooling.

10. A two-package angel food cake mix comprising dried egg white and sugar in one package and farinaceous ingredient having added thereto a hexane-extractable fat within the range of about 0.04–1.5% by weight of the dried egg white in the mix in the other package, said farinaceous ingredient being the sole farinaceous ingredient of the mix, wherein the aggregate level of fat present in the mix is present in an amount insufficient to cause collapse of the foam batter and prevent sufficient expansion of the cells of the egg white foam batter upon baking but sufficient to prevent excessive swelling of the foam batter on baking and subsequent collapse of the cake on cooling.

11. A two-package angel food cake mix according to claim 10 wherein the farinaceous ingredient is comprised of about 25–40% wheat flour and about 75–60% solvent extracted wheat flour.

12. A two-package angel food cake mix according to claim 10 wherein the farinaceous ingredient is comprised of about 25–40% wheat flour and about 75–60% solvent extracted wheat flour, said farinaceous ingredient having a hexane-extractable fat content within the range of about 1.2–1.5% of the dried egg white present in the mix.

References Cited in the file of this patent

UNITED STATES PATENTS

| | | |
|---|---|---|
| 1,900,094 | Bohn | Mar. 7, 1933 |
| 2,176,079 | Katzman | Oct. 17, 1939 |
| 2,355,547 | Musher | Aug. 8, 1944 |

FOREIGN PATENTS

| | | |
|---|---|---|
| 670,547 | Great Britain | Apr. 16, 1952 |

OTHER REFERENCES

"Food Manufacture," July 5, 1940, page 185.